(12) United States Patent
Kim et al.

(10) Patent No.: US 10,404,686 B2
(45) Date of Patent: Sep. 3, 2019

(54) SECURITY METHOD AND APPARATUS FOR ELECTRIC VEHICLE POWER TRANSFER SYSTEM

(71) Applicant: Hyundai Motor Company, Seoul (KR)

(72) Inventors: Do Hoon Kim, Seoul (KR); Kang Hoon Lee, Seoul (KR)

(73) Assignee: Hyundai Motor Company, Seoul (KR)

(*) Notice: Subject to any disclaimer, the term of this patent is extended or adjusted under 35 U.S.C. 154(b) by 301 days.

(21) Appl. No.: 15/290,210

(22) Filed: Oct. 11, 2016

(65) Prior Publication Data

US 2017/0111347 A1 Apr. 20, 2017
US 2019/0245841 A9 Aug. 8, 2019

(30) Foreign Application Priority Data

Oct. 20, 2015 (KR) .......... 10-2015-0145922

(51) Int. Cl.
*H04W 12/06* (2009.01)
*H04L 29/06* (2006.01)
(Continued)

(52) U.S. Cl.
CPC ............ *H04L 63/083* (2013.01); *B60L 53/12* (2019.02); *B60L 53/65* (2019.02); *G06F 21/62* (2013.01);
(Continued)

(58) Field of Classification Search
CPC .. H04L 63/083; B60L 11/182; B60L 2250/16; B60L 2270/38; B06F 21/62;
(Continued)

(56) References Cited

U.S. PATENT DOCUMENTS

2010/0006356 A1* 1/2010 Curry ................ B60L 8/00
180/65.8
2011/0022222 A1* 1/2011 Tonegawa ............ B60L 8/003
700/232
(Continued)

FOREIGN PATENT DOCUMENTS

CN 102184575 A 9/2011
CN 102800133 A 11/2012
(Continued)

OTHER PUBLICATIONS

John M. Miller, Omer C. Onar, and Madhu Chinthavali, "Primary-Side Power Flow Control of Wireless Power Transfer for Electric Vehicle Charging," IEEE Journal of Emerging and Selected Topics in Power Electronics, vol. 3, No. 1 Mar. 2015 (Year: 2015).*
(Continued)

*Primary Examiner* — Kevin H Flynn
*Assistant Examiner* — Brian Adams Heflin
(74) *Attorney, Agent, or Firm* — Mintz Levin Cohn Ferris Glovsky and Popeo, P.C.; Peter F. Corless

(57) ABSTRACT

A security method and apparatus for an electric vehicle (EV) power transfer system can prevent abuse of privacy information or financial information which is stored in an in-vehicle controller, and block fee charging and authentication. A security method for the EV power transfer system, performed by a charging controller installed in an EV, includes steps of: receiving an authentication request from a communication controller installed in the EV; authenticating second key information included in the authentication request based on first key information which is learned or stored beforehand; and when the authentication succeeds, starting a charging process.

9 Claims, 6 Drawing Sheets

(51) Int. Cl.
*G06F 21/62* (2013.01)
*H04W 12/02* (2009.01)
*G06Q 30/02* (2012.01)
*G06Q 50/06* (2012.01)
*B60L 53/12* (2019.01)
*B60L 53/65* (2019.01)

(52) U.S. Cl.
CPC ......... *G06Q 30/0283* (2013.01); *G06Q 50/06* (2013.01); *H04W 12/02* (2013.01); *B60L 2250/10* (2013.01); *B60L 2250/16* (2013.01); *B60L 2270/32* (2013.01); *B60L 2270/38* (2013.01); *H04W 12/06* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01); *Y04S 50/14* (2013.01)

(58) Field of Classification Search
CPC .... G06Q 30/0283; G06Q 50/06; H01F 27/24; H01F 27/28; H02M 2001/0067; H04W 12/06; H04W 12/042; H04W 12/08; G06F 3/0482; G06F 3/048; G06F 3/0481; G06F 3/0484; G06F 3/1204; G06F 3/1229; G06F 3/1239; G06F 3/12885; G06F 3/1292; G06F 1/20; G06F 1/206; G06F 11/2289; G06F 11/3058; G06F 13/387; G06F 13/4221; G06N 20/00; G06N 3/02; B60R 25/24; H02J 9/06; H02J 7/027

See application file for complete search history.

(56) References Cited

U.S. PATENT DOCUMENTS

| | | | | |
|---|---|---|---|---|
| 2011/0078092 | A1* | 3/2011 | Kim | B60L 11/1824 705/412 |
| 2013/0320922 | A1* | 12/2013 | Acena | B60L 11/1811 320/109 |
| 2013/0346025 | A1* | 12/2013 | Schulz | B60L 11/1838 702/182 |
| 2015/0077054 | A1* | 3/2015 | Uyeki | H02J 7/0052 320/109 |
| 2015/0149221 | A1* | 5/2015 | Tremblay | B60L 11/1846 705/5 |
| 2015/0151645 | A1* | 6/2015 | Yamamaru | B60K 15/05 320/109 |

FOREIGN PATENT DOCUMENTS

| | | |
|---|---|---|
| JP | 2003-196755 A | 7/2003 |
| JP | 2009-282758 A | 12/2009 |

OTHER PUBLICATIONS

"On Board Controller", XP-002764648, 2 pages, electromobility.efacec.com.

European Search Report for European Patent Application No. 16193887.3, dated Dec. 6, 2016, 9 pages.

* cited by examiner

SECURITY METHOD AND APPARATUS FOR ELECTRIC VEHICLE POWER TRANSFER SYSTEM

CROSS-REFERENCE TO RELATED APPLICATION

This application claims under 35 U.S.C. § 119(a) the benefit of Korean Patent Application No. 2015-0145922 filed on Oct. 20, 2015 in the Korean Intellectual Property Office (KIPO), the entire contents of which are incorporated by reference herein.

BACKGROUND

1. Technical Field

The present disclosure relates to security technology for a vehicle, and more particularly, to a security method and apparatus for an electric vehicle (EV) power transfer system, which can prevent charging and authentication of an EV by unauthorized persons, thus protecting privacy information and financial information stored in a controller installed in the EV.

2. Description of the Related Art

Various tasks are undertaken for preparing charging and authentication in a next-generation vehicle charging system used for environment-friendly vehicles such as electric vehicles (EV), plug-in EVs, and plug-in hybrid EVs. With regard to an EV charging system, there is a possibility that privacy information and/or financial information are applied to a controller installed in a vehicle.

Meanwhile, theft or loss of a controller in the vehicle, access by unauthorized persons, or abuse of the controller in the aftermarket may result in cases in which the controller of a specific user can be used in other cars.

Thus, some vehicle makers have proposed a way in which a charging process is undertaken after an in-vehicle controller is authenticated by an external charger, and charging fees are settled after completion of the charging process. A plug and charge (PnC) proposed by the RWE and Daimler in Germany is one of the representative methods.

However, even when an in-vehicle controller is authenticated before starting a charging process between an EV and an external charger, it is impossible to identify a case in which a stolen controller is installed in a different car.

Therefore, it is desirable to develop security methods and apparatuses for the in-vehicle controller storing privacy information and/or financial information in the EV charging system.

SUMMARY

Example embodiments of the present disclosure provide a security method and apparatus for an EV wireless power transfer system, which can identify whether an in-vehicle controller originally belongs to a vehicle or not before a charging mechanism between an EV and an external charger is started.

Example embodiments of the present disclosure also provide a security method and apparatus for an EV wireless power transfer system, which can effectively prevent a process of charging a fee and/or authentication for an EV when privacy information and/or financial information stored in an in-vehicle controller are stolen or lost.

In order to achieve the above-described objectives, an aspect of the present disclosure provides a security method for an electric vehicle (EV) power transfer system, performed by a charging controller installed in an EV. The method may comprise receiving an authentication request from a communication controller installed in the EV; authenticating second key information included in the authentication request based on first key information which is learned or stored beforehand; and when the authentication succeeds, starting a charging process.

Also, the method may further comprise, after the authenticating, blocking the charging process when the authentication is determined as failed.

Here, the method may further comprise, after the blocking, outputting a warning message.

Here, in the receiving the authentication request, the second key information may be received through a controller area network (CAN) communication or an Ethernet communication.

Also, the method may further comprise, before the receiving the authentication request, receiving a start signal for charging the EV from the communication controller or an external entity.

Also, the method may further comprise, after starting the charging process, performing and completing the charging process in a conductive manner or wireless power transfer manner through command and control communications with an external charger connected via the communication controller; and performing a process for charging a fee based on an amount of power supplied from the external charger to the EV by using privacy information or financial information corresponding to the first key information and second key information.

In order to achieve the above-described objective, another aspect of the present disclosure provides a security method for an electric vehicle (EV) power transfer system, performed by a charging authentication apparatus installed in an EV. The method may comprise receiving, by a charging controller of the charging authentication apparatus, an authentication request from a communication controller installed in the EV; and in response to the authentication request, transmitting third key information which is learned or stored beforehand to the charging controller installed in the EV, wherein the charging controller authenticates the third key information based on first key information which is learned or stored beforehand, and proceeds with a charging process when the authentication succeeds.

Also, the method may further comprise, before the receiving the authentication request, receiving a start signal for charging the EV from an external charger or the communication controller.

Also, the third key information may include key information identical to an identifier or a random number stored in at least one of a controller of the EV, a smart key system control part of the EV, and an engine controller of the EV, and the charging authentication apparatus may be installed in the EV as hidden and fixed by using a bracket.

Also, the method may further comprise, after proceeding with the charging process, receiving, by the communication controller, a request of charging a fee for an amount of power supplied from the charger to the EV during the charging process from the charger; and performing a process for charging a fee based on the amount of power supplied from the charger to the EV by using privacy information or financial information corresponding to the first key information and second key information.

In order to achieve the above-described objective, yet another aspect of the present disclosure provides a security method for an electric vehicle (EV) power transfer system, performed by a charging controller installed in an EV. The method may comprise receiving second key information from a communication controller installed in the EV, wherein the communication controller receives an authentication request from outside of the EV, and transmits the authentication request to a charging authentication apparatus installed in the EV; receiving third key information from the charging authentication apparatus, wherein the charging authentication apparatus transmits the third key information to the charging controller in response to the authentication request; and authenticating the third key information based on the second key information; and proceeding with a charging process when the authentication succeeds.

Also, the second key information or the third key information may include key information identical to an identifier or a random number stored in at least one of a controller of the EV, a smart key system control part of the EV, and an engine controller of the EV.

Also, the method may further comprise, after the authenticating, blocking the charging process when the authentication is determined as failed.

Also, the method may further comprise, before the receiving the second key information and the receiving the third key information, receiving a start signal for charging the EV from an external charger or the communication controller, wherein the start signal may include a beacon signal, a signal indicating start of network connection, or a wake on wireless local area network (WoWL) signal.

Also, the method may further comprise, after proceeding with the charging process, receiving, by the communication controller, a request of charging a fee for an amount of power supplied from the charger to the EV during the charging process from the charger; and performing a process for charging a fee based on the amount of power supplied from the charger to the EV by using privacy information or financial information corresponding to the first key information and second key information.

In order to achieve the above-described objective, yet another aspect of the present disclosure provides a computing apparatus performing a security method for an electric vehicle (EV) power transfer system. The apparatus may comprise a comparison part of a charging controller receiving an authentication request from a communication controller installed in an EV, and comparing second key information included in the authentication request with first key information or third key information; and a charging blocking part of the charging controller authenticating or blocking a charging process based on a comparison result of the comparison part.

Also, the comparison part and the charging blocking part may be included in a charging controller equipped in the EV.

Also, the apparatus may further comprise an interface connecting with communication controller, wherein the interface uses a controller area network (CAN) communication in the EV.

Also, the apparatus may further include a storage part storing the first key information, the apparatus may be connected to the communication controller providing the second key information via the interface, or the apparatus may be connected to a charging authentication apparatus providing the third key information via the interface.

Also, the charging authentication apparatus may be installed in the EV as hidden and fixed by using a bracket.

Using the above-described security method and apparatus for an EV wireless power transfer system according to example embodiments of the present disclosure, it can be identified whether an in-vehicle controller originally belongs to an EV before a charging mechanism between the EV and an external charger is started. Through this, charging of the EV, according to abuse of privacy information or financial information in the EV wireless power transfer system, can be prevented, and reliability and stability of the privacy information and financial information stored in the in-vehicle controller can be greatly enhanced.

Also, using an additional charging authentication apparatus, even when the in-vehicle controller storing the privacy information and financial information is stolen or lost, the EV charging abusing them can be effectively prevented. Thus, abuse of the in-vehicle controller for the EV wireless power transfer system can be made difficult, and theft of controllers related to the EV charging can be suppressed.

BRIEF DESCRIPTION OF DRAWINGS

Example embodiments of the present disclosure will become more apparent by describing in detail example embodiments of the present disclosure with reference to the accompanying drawings, in which.

DETAILED DESCRIPTION OF THE EMBODIMENTS

Figure 1:
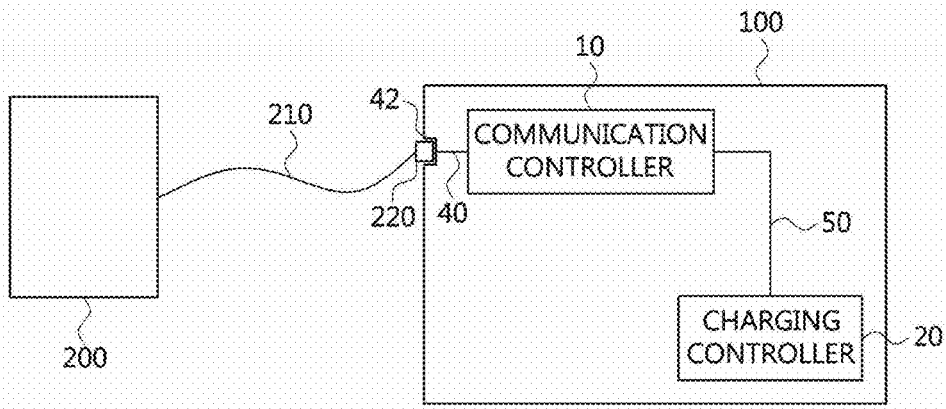
FIG. 1 is a block diagram to explain an electric vehicle power transfer system using a security method according to an example embodiment of the present disclosure.

Example embodiments of the present disclosure are disclosed herein. However, specific structural and functional details disclosed herein are merely representative for purposes of describing example embodiments of the present disclosure, however, example embodiments of the present disclosure may be embodied in many alternate forms and should not be construed as limited to example embodiments of the present disclosure set forth herein. While describing the respective drawings, like reference numerals designate like elements.

It will be understood that although the terms "first", "second", etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the exemplary embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

'Electric Vehicle, EV': A vehicle, e.g., an automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

'Plug-in Electric Vehicle, PEV': An Electric Vehicle that recharges the on-vehicle primary battery by connecting to the power grid.

'Plug-in vehicle, PV': An electric vehicle rechargeable through wireless charging from an electric vehicle supply equipment (EVSE) without using a physical plug or a physical socket.

'Heavy duty vehicle; H.D. Vehicle': Any four-or more wheeled vehicle as defined in 49 CFR 523.6 or 49 CFR 37.3 (bus).

'Light duty plug-in electric vehicle': A three or four-wheeled vehicle propelled by an electric motor drawing current from a rechargeable storage battery or other energy devices for use primarily on public streets, roads and highways and rated at less than 4,545 kg gross vehicle weight.

'Wireless power charging system, WCS': The system for wireless power transfer and control between the GA and VA including alignment and communications. This system, in the forward direction, transfers energy from the electric supply network to the electric vehicle electromagnetically through a two-part loosely coupled transformer.

'Wireless power transfer, WPT': The transfer of electrical power from the AC supply network to the electric vehicle by contactless means.

'Utility': A set of systems which supply electrical energy and include a customer information system (CIS), an advanced metering infrastructure (AMI), rates and revenue system, etc. The utility may provide the EV with energy through a rate table and discrete events. Also, the utility may provide information about certification on EVs, interval of power consumption measurements, and tariffs.

'Smart charging': A system in which EVSE and/or PEV communicate with a power grid in order to optimize a charging ratio or discharging ratio of the EV by reflecting capacity of the power grid or expense of use.

'Automatic charging': A procedure in which inductive charging is automatically performed after a vehicle is located in a proper position corresponding to a primary charger assembly that can transfer power. The automatic charging may be performed after obtaining a necessary authentication and right.

'Interoperability': A state in which a component of a system interworks with corresponding components of the system in order to perform operations aimed by the system. Also, information interoperability may mean a capability that two or more networks, systems, devices, applications, or components can efficiently share and easily use information without giving inconvenience to users.

'Inductive charging system': A system transferring energy from a power source to an EV through a two-part gapped core transformer in which the two halves of the transformer, primary and secondary coils are physically separated from one another. In the present disclosure, the inductive charging system may correspond to an EV power transfer system.

'Inductive coupler': The transformer formed by the coil in the GA Coil and the coil in the VA Coil that allows power to be transferred with galvanic isolation.

'Inductive coupling': Magnetic coupling between two coils, which in the present disclosure, refers to coupling between the GA Coil and the VA Coil.

'Ground assembly, GA': An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

'Vehicle assembly, VA': An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

'Primary device': An apparatus which provides the contactless coupling to the secondary device. That is, the primary device may be an apparatus external to an EV. When the EV is receiving power, the primary device may act as the source of the power to be transferred. The primary device may include the housing and all covers.

'Secondary device': An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

'GA controller': The portion of the GA which regulates the output power level to the GA Coil based on information from the vehicle.

'VA controller': The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

'Magnetic gap': The vertical distance between the plane of the higher of the top of the litz wire or the top of the magnetic material in the GA Coil to the plane of the lower of the bottom of the litz wire or the magnetic material in the VA Coil when aligned.

'Ambient temperature': The ground-level temperature of the air measured at the subsystem under consideration and not in direct sun light.

'Vehicle ground clearance': The vertical distance between the ground surface and the lowest part of the vehicle floor pan.

'Vehicle magnetic ground clearance': The vertical distance between the plane of the lower of the bottom of the litz wire or the magnetic material in the VA Coil mounted on a vehicle to the ground surface.

'VA Coil magnetic surface distance': the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

'Exposed conductive component': A conductive component of electrical equipment (e.g. an electric vehicle) that may be touched and which is not normally energized but which may become energized in case of a fault.

'Hazardous live component': A live component, which under certain conditions can give a harmful electric shock.

'Live component': Any conductor or conductive component intended to be electrically energized in normal use.

'Direct contact': Contact of persons with live components. (See IEC 61440)

'Indirect contact': Contact of persons with exposed, conductive, and energized components made live by an insulation failure. (See IEC 61140)

'Alignment': A process of finding the relative position of primary device to secondary device and/or finding the relative position of secondary device to primary device for the efficient power transfer that is specified. In the present disclosure, the alignment may direct to a fine positioning of the wireless power transfer system.

'Pairing': A process by which a vehicle is correlated with the unique dedicated primary device, at which it is located and from which the power will be transferred. The pairing may include the process by which a VA controller and a GA controller of a charging spot are correlated. The correlation/association process may include the process of the establishment of a relationship between two peer communication entities.

'Command and control communication': The communication between the EV supply equipment and the EV exchanges information necessary to start, control and terminate the process of WPT.

'High level communication (HLC)': HLC is a special kind of digital communication. HLC is necessary for additional services which are not covered by command & control communication. The data link of the HLC may use a power line communication (PLC), but it is not limited.

'Low power excitation (LPE)': LPE means a technique of activating the primary device for the fine positioning ad pairing so that the EV can detect the primary device, and vice versa.

The charging station may comprise at least one GA and at least one GA controller managing the at least one GA. The GA may comprise at least one wireless communication device. The charging station may mean a place having at least one GA, which is installed in home, office, public place, road, parking area, etc.

Further, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, preferred example embodiments according to the present disclosure will be explained in detail by referring to accompanying figures.

FIG. 1 is a block diagram to explain an electric vehicle power transfer system using a security method according to an example embodiment of the present disclosure.

Referring to FIG. 1, the EV power transfer system according to the present embodiment of the present disclosure may transfer power from a charger 200 to an EV 100 via a charging cable 210. The EV 100 may include a communication controller 10 and a charging controller 20, and the charger 200 may be a conductive charger. The EV 100 and the charger 200 may perform command and control (C&C) communications with each other.

Although the EV power transfer system according to the present embodiment uses the conductive charging, the system is not restricted to the conductive charging. That is, the EV power transfer system may further include a component performing wireless power transfer. However, for convenience of explanation, it will be explained that the EV power transfer system according to the present embodiment operates in the conductive manner.

In addition to the transmission/reception function for exchanging C&C data needed for the conductive charging with the charger 200, which the communication controller 10 as an in-vehicle controller has, the communication controller 10 may convert information (i.e. information on the charger 200) received from the charger 200 via power line communication (PLC) to signals for an in-vehicle network. The communication controller 10 may include a processor, a memory, and an input/output device. Such the communication controller 10 may be a PLC controller. The conductive charging using the PLC controller may be referred to as a direct current (DC) combo charging. Here, the PLC may be a communication technology that can transmit and receive voices, messages, and data by using a power line supplying power as a medium.

Meanwhile, the charging controller 20 is an in-vehicle controller which is responsible for high-voltage charging of a high-voltage battery installed in an EV. The charging controller 20 may be referred to as a battery management system (BMS) or an on-board charger.

In the present embodiment, the communication controller 10 and the charging controller 20 may have common key information. The common key information may be stored or learned when the EV is released from a factory. However, various embodiments are not restricted to the above configuration. For example, the key information may be authenticated by an external apparatus via a user interface or a communication interface of the EV, or learned or stored in the communication controller 10 and the charging controller 20 by a user or an administrator having a right.

The conductive charging may mean a charging manner in which power is supplied via a conductive material. For example, the conductive charging may include all charging manners in which the charger 200 connected to a grid converts power of the grid and supplies the converted power to the EV 100 via a cable having at least one connector in both ends of the cable.

Here, the connector may be a connector for charging. It may be inserted into an inlet of the EV, and a part of a coupler, which is a conductive element establishing electrical connection between the charger and the EV. The coupler may indicate a set of the EV inlet and the connector.

Also, the conductive charging may require three functions which should be performed for charging an EV or PHEV from the grid, two of which are electrical functions, and one of which is a mechanical function. Here, the grid may supply an alternating current (AC) having one of various nominal voltages ($V_{rms}$) and one of frequencies (e.g. 60 Hz). The battery of EV/PHEV may be a DC apparatus operating based on a variable voltage depending upon a nominal battery voltage, a charging status, and a ratio of charging and discharging. Among the above-described three functions, the first electrical function is a function for converting AC to DC, which is usually referred to as 'rectifying'. Also, the second electrical function is a function for controlling or adjusting a voltage applied to the battery according to various parameters such as charging characteristics of the battery—voltage, capacity, or electrochemistry, and other parameters, so that a charging ratio is maintained under a permitted level. The combination of the above two functions may be a usual role of the charger 200. In addition, the mechanical function is a function for physically connecting the EV/PHEV to an EVSE, and may be performed by an automatic apparatus, a driver, a manager, etc. Thus, the conductive charging system may include the charger 200 and a coupler connected to the charger 200. In the present embodiment, the coupler may include a cable 210, and a terminal (second terminal) 220.

Also, the EV 100 according to the present embodiment may further include a first communication interface 40, a terminal 42, and a second communication interface 50.

The first communication interface 40 may connect the communication controller 10 and the terminal 42, and support C&C communications and/or high-level communications between them. The first communication interface 40 may support PLC. For this, a conductive channel or an electrical wire connecting the first communication interface 40, the coupler 42 and 220, and the cable 210 may exist between the communication controller 10 and the charger 200.

The terminal 42 may be a component which selectively supports electrical connection or electrical disconnection between the EV 100 and the external charger 200. The terminal 42 may be referred to as a first terminal, and the terminal 220 may be referred to as a second terminal. That is, the first terminal 42 and the second terminal 220 may selectively connect or disconnect a power line and/or a communication line of the communication controller 10 to a power line and/or a communication line of the charger 200.

Also, as a structure for the conductive charging, the terminal 42 may have a form of plug, socket-outlet, receptacle, or a combination of them. For example, the first terminal 42 and the second terminal 220 may be coupled with each other, having a connection form of plug and socket-outlet. Such the terminal 42 may have a contact. The contact may indicate a portion of conductive material in a connector, which is coupled with a corresponding portion in the EV inlet in order to provide an electrical path.

The second communication interface 50 may connect the communication controller 10 and the charging controller 20, and support C&C communications and/or high-level communications between them. The second communication interface 50 may support a high-speed controller area network (CAN) communication. For this, the second communication interface 50 may include a communication line or a cable between the communication controller 10 and the charging controller 20. Using the CAN communication, the communication controller 10 and the charging controller 20 may communicate with other controllers in the EV via a single CAN wire or double CAN wires connected with them. In the case of the double CAN wires, one of two wires may be a redundant wire used for error checking or as a reserved wire.

The charger 200 may be an electrical apparatus which can convert AC energy to an adjusted DC current, and supply the DC current to a rechargeable energy storage apparatus (e.g. battery) as an energy needed for operating various electronic devices in the EV. Also, the charger 200 may indicate an apparatus for charging the EV by using a standard AC supply voltage under 1000V or a DC supply voltage under 1500V. The charger 200 may also be an on-board charger installed in the EV. In the present embodiment, the charger 200 having a type of off-board charger will be explained.

Also, the charger 20 may include a controller which performs C&C communications and high-level communications for the conductive charging with the communication controller 10 and/or charging controller 20. The charger 200 may perform a mode-1 charging, a mode-2 charging, a mode-3 charging, or a mode-4 charging through the C&C communications (refer to IEC 61851-1). The controller of the charger 200 may be referred to a GA controller. The composition of the charger 200 may be referred to a structure of a GA 7 explained referring to FIG. 8.

Figure 2:
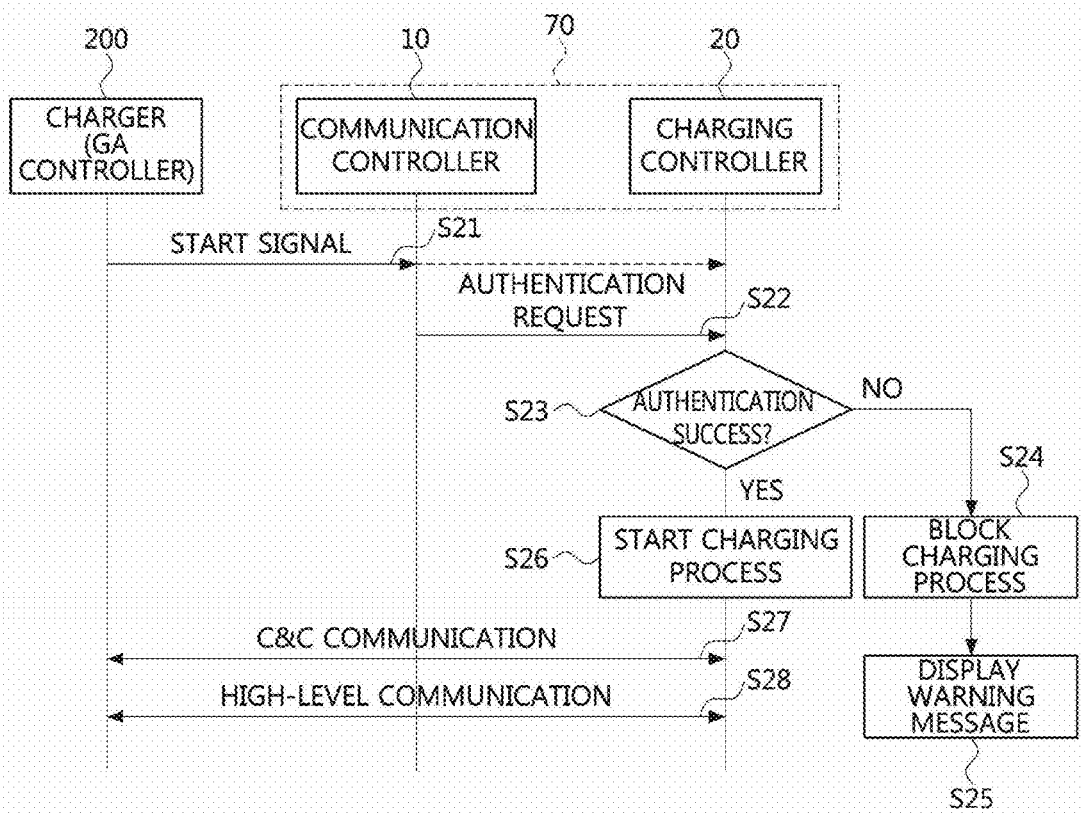
FIG. 2 is a sequence chart to explain a security method of an EV power transfer system.

FIG. 2 is a sequence chart to explain a security method of an EV power transfer system.

Referring to FIG. 2, a security method of an EV power transfer system according to an example embodiment of the present disclosure may be started after the EV and the charger 200 are connected via a coupler.

As described above, the EV may include the communication controller 10 and the charging controller 20, and the communication controller 10 and the charging controller 20 may correspond to a VA controller 70 equipped in the VA, an electric vehicle communication controller (EVCC)

equipped in the EV, or a secondary device communication controller (SDCC) equipped in the EV. However, in the present embodiment, the communication controller 10 and the charging controller 20 may be located with a predetermined distance and connected via a high-speed CAN network. That is, the communication controller 10 and the charging controller 20 may not exist as a single entity into which they are integrated.

The charger 200 may include a GA, and a GA controller in the GA. The GA controller may perform digital communications for exchanging digitally-coded information with the EV. The GA controller may correspond to a supply equipment communication controller (SECC) or a primary device communication controller (PDCC) equipped in an electric vehicle supply equipment (EVSE).

First, the communication controller 10 and the charging controller 20 may receive a start signal for conductive charging from the charger 200 (S21). The start signal may be a signal for waking up the communication controller 10 and the charging controller 20 which are related to battery charging. Also, the start signal may be a signal for transferring information on the charger 200 to the charging controller 20. Here, the information on the charger 200 may include information on the type of a power supply unit in the charger 200, power capacity, etc. Also, the information on the charger 200 may be used for authenticating establishment of proper communications. In this step, the start signal is transferred only to the communication controller 10. A start signal for the charging controller 20 may be transferred from the communication controller 10, of course, vice versa.

Then, the communication controller 10 may transmit an authentication request signal to the charging controller 20 (S22). The authentication request signal may include second key information which is learned or stored beforehand in the communication controller 10.

Then, the charging controller 20 may determine whether the authentication succeeds or not by comparing the second key information with first key information (S23). The first key information may be learned or stored in the charging controller 20 when the EV is released from a factory.

After the determination, if the authentication is determined as failed, the charging controller 20 may block a charging process (S24). Also, according to implementation, the charging controller 20 may output a predetermined warning message (S25). The warning message may be output by using a display apparatus, a speaker, etc. equipped in the EV, and transmitted to a preconfigured recipient. The warning message may include a message notifying that privacy information or financial information stored in the communication controller 10 and/or charging controller 20 are illegally used, or a message informing the preconfigured recipient (e.g. a manager of the charger, or an original owner of the controller) of that the communication controller 10 and/or charging controller 20 are illegally used.

Also, if the authentication is determined as succeeded, the charging controller 20 may start the charging process (S26). Then, the charging controller 20 may control the charging process through the C&C communications with the charger 200 (S27). Also, the charging controller 20 may perform a process of charging a fee via high-level communications with the charger 200 (S28). The process of charging a fee may be performed based on the amount of power supplied from the charger 200 to the EV by using the privacy information and/or financial information which are stored in the communication controller 10 and/or charging controller 20 and have been previously authenticated.

According to the present embodiment, even when the in-vehicle controller storing the privacy information or financial information, such as the communication controller 10 or the charging controller 20, are stolen or lost, abuse of the privacy information or financial information can be prevented by using the key information learned or stored respectively by the communication controller 10 and the charging controller 20.

Meanwhile, although the case to which the conductive charging is applied was explained as an example, various embodiments according to the present disclosure may also be applied to wireless power transfer. In the case of wireless power transfer, the EV and the charger 200 may exchange signals or messages via a point-to-point link (P2PL) including a point-to-point communication (P2PC) or a point-to-point signaling (P2PS), or a wireless local area network (referred to as WLAN or WiFi).

Figure 3:
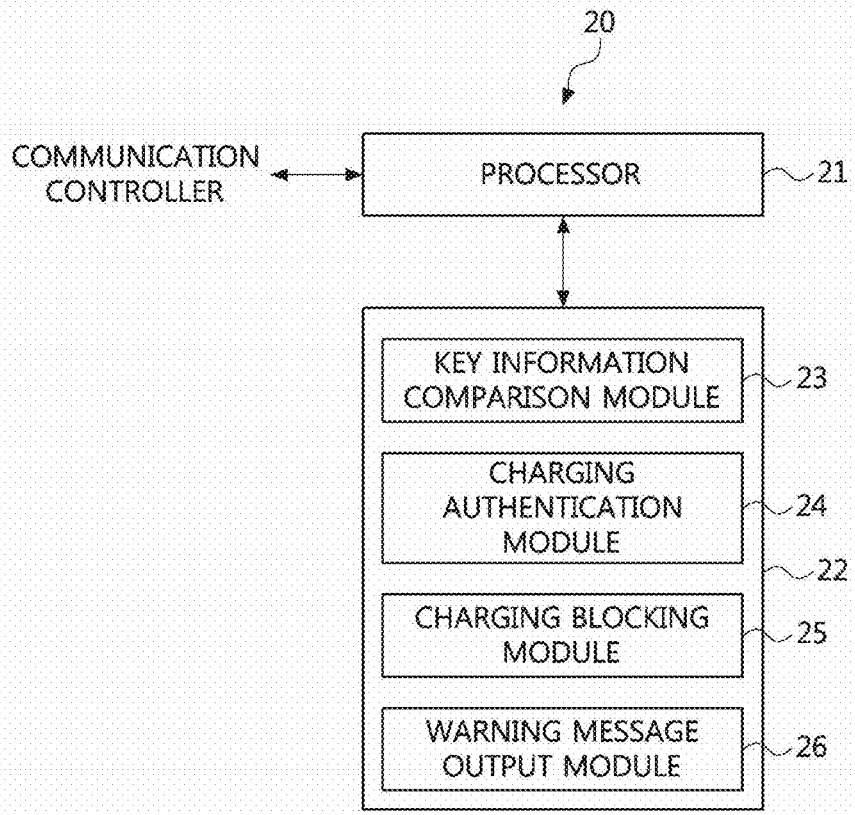
FIG. 3 is a block diagram of a security apparatus for an EV power transfer system.

FIG. 3 is a block diagram of a security apparatus for an EV power transfer system.

Referring to FIG. 3, the charging controller 20 according to the present embodiment may include a processor 21 and a memory 22. The charging controller 20 may further include an input/output device, a communication device, or an interface. For convenience of illustration and description, they are omitted.

As described above, the processor 21 may perform charging authentication by comparing the second key information from the communication controller 10 with the first key information that it owns, and operate to block a charging process when the charging authentication does not succeed. The processor 21 may output a warning message when the charging process is blocked.

The processor 21 may include at least one core and a cache memory. In case that the processor 21 has a multi-core architecture, the multi-core architecture may be a single package including integrated circuits, into which two or more independent cores are integrated. Also, in case that the processor 21 has a single-core architecture, the single core may be a central processing unit (CPU). The CPU may be implemented as a system on chip (SoC) into which a micro control unit and various peripheral devices (or, integrated circuitry for external peripheral devices) are integrated. However, various embodiments are not limited to the above examples. Here, the core may include registers storing instructions to be executed, an arithmetic logical unit (ALU) performing comparison, determination, and operations, a control unit controlling the CPU for interpretation and execution of the instructions, an internal bus, etc.

The above-described processor 21 may include at least one of a data processor and an image processor, or a combination of them. Of course, the processor 21 may include at least one electronic control unit (ECU) embedded in a vehicle. In addition, the processor 21 may include a peripheral interface and a memory interface. In this case, the peripheral interface may connect the processor 21 to an input/output system and other peripheral devices (e.g. communication device, engine control unit, navigation system, in-vehicle display apparatus, in-vehicle speaker system, etc.), and the memory interface may connect the processor 21 to the memory 22.

The memory 22 may store a plurality of modules for implementing security methods of the EV wireless power transfer system. The plurality of modules may include a key information comparison module 23, a charging authentication module 24, a charging blocking module 25, and a warning message output module 26. The plurality of modules may basically include a charging control module for controlling start, continuation, and end of the charging process. Also, functions of the respective modules may be identical to those of the above-described method, and thus redundant explanation is omitted.

Meanwhile, according to the present embodiment, components of the charging controller 20 which perform a security method for the EV wireless power transfer system may be services or functions implemented by executing functional blocks or modules stored in the memory 22. However, various embodiments are not restricted to the above-described example. The above-described components may be implemented to operate in an ECU of the EV, as stored in a computer readable medium in a software form for implementing predetermined functions (at least part of the security method), or transmitted to a remote site in a carrier form. Here, the computer readable medium may be connected to a plurality of computing apparatuses or a cloud system which are connected through a network, and at least one of the plurality of computing apparatuses and the cloud system may store source code, intermediate code, or executable code for performing the security method according to the present disclosure.

The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

Figure 4:
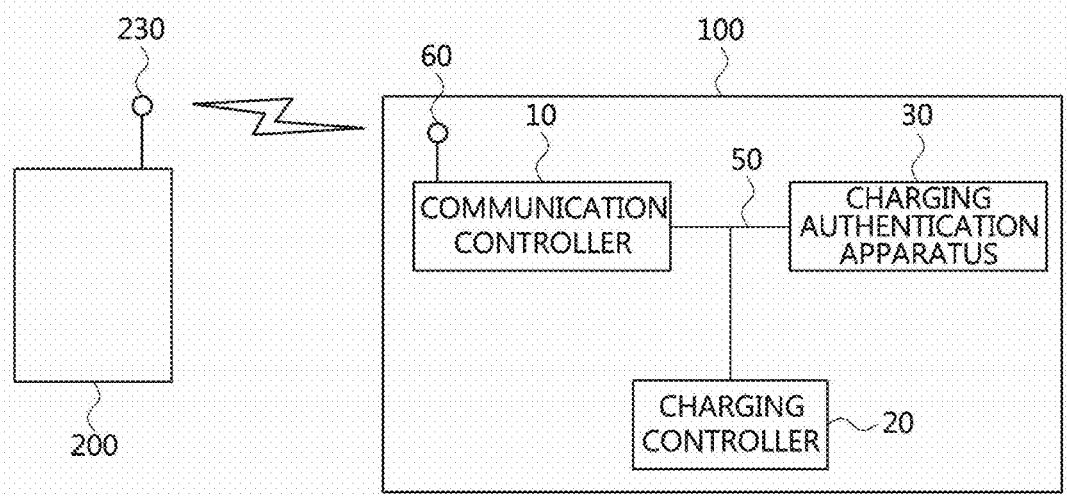
FIG. 4 is a block diagram to explain an electric vehicle power transfer system using a security method according to another example embodiment of the present disclosure.

FIG. 4 is a block diagram to explain an electric vehicle power transfer system using a security method according to another example embodiment of the present disclosure.

Referring to FIG. 4, the EV power transfer system according to another example embodiment may prevent abuse of privacy information or financial information stored in the in-vehicle controller during the power transfer procedure or the procedure of charging a fee performed between the EV 100 and the charger 200. The in-vehicle controller may include the communication controller 10, the charging controller 20, and a charging authentication apparatus 30.

The EV 100 and the charger 200 may exchange signals and messages via WLAN or P2PL. For this, the EV 100 may include at least one antenna 60, and the charger 200 may also include at least one antenna 230. In addition, although not illustrated in FIG. 4, when the charger 200 transfers power to the EV 100 in the wireless power transfer manner, the charger 200 may include a primary coil or a GA coil (refer to 104 of FIG. 8), and the EV 100 may include a secondary coil or a VA coil (refer to 105 of FIG. 8).

In order to prevent abuse of privacy information or financial information stored in the in-vehicle controller equipped in the EV, the communication controller 10, the charging controller 20, and the charging authentication apparatus 30 of the EV 100 may be configured to inter-compare key information stored and learned in different controllers.

The communication controller 10 and the charging controller 20 may be practically identical to those explained referring to FIG. 1 and FIG. 2 except detail functions which will be described by referring to FIG. 5.

The charging authentication apparatus 30 may be an apparatus configured to store privacy information and/or financial information of a user, learn or store third key information corresponding to the privacy information and/or the financial information, and authenticate, for the charging process, the first key information of the charging controller and the second key information of the communication controller. The apparatus 30 may be attached to the EV 100 as a removable-type apparatus or a fixed-type apparatus.

In the case that the apparatus 30 is the fixed type apparatus, the charging authentication apparatus 30 may be hidden in the EV 100 as fixed by using a bracket. Such the structure may prevent even a thief from detaching the apparatus 30 from the EV 100 during at least minimum required time (e.g. 3 minutes).

In the case that the apparatus 30 is the removable-type apparatus, the charging authentication apparatus 30 may include a first part storing the privacy information and/or financial information, and a second part fixed in the EV. In this case, the user may carry the first part which is a portable device, and combine the first part and the second part in order to perform charging authentication when the user wants to charge the battery of the EV.

The charging authentication apparatus 30 may include an authentication module having a form of a subscriber identification card or a similar card in which user's privacy information and/or financial information are stored, a slot into which the authentication module can be inserted, and a communication part connected to the slot. The subscriber identification card may include an IC card implementing a subscriber identification module (SIM). Also, the SIM may include a universal SIM (USIM). The communication part may include a CAN interface.

Figure 5:
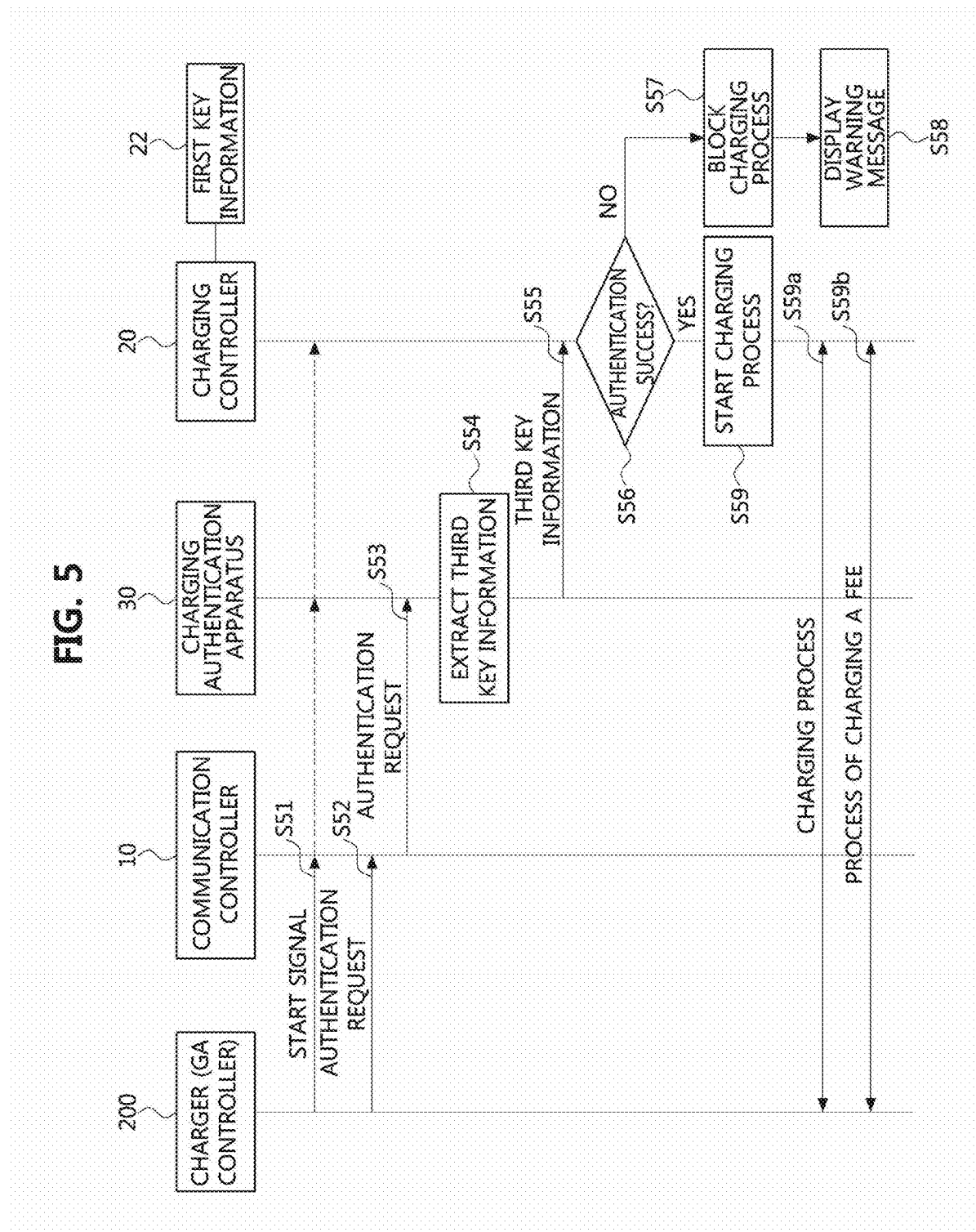
FIG. 5 is a sequence chart of a security method of an EV power transfer system according to another example embodiment of the present disclosure.

FIG. 5 is a sequence chart of a security method of an EV power transfer system according to another example embodiment of the present disclosure.

Referring to FIG. 5, a security method for an EV power transfer system according to the present embodiment may be started based on configuration of communications between the charger 200 and the EV wanting to charge its battery. The EV and the charger 200 may exchange signals and messages via P2PL including P2PC or P2Ps and/or WLAN.

First, the communication controller 10, the charging controller 20, and the charging authentication apparatus 30 may receive a start signal for EV charging based on wireless power transfer from the charger 200 (S51). In this step, the start signal may be transferred only to the communication controller 10, and the communication controller 10 may transfer the start signal to the charging controller 20 or the charging authentication apparatus 30, and vice versa.

Then, the communication controller 10 may transmit an authentication request signal to the charging authentication apparatus 30 (S53). In response to receipt of the start signal, the communication controller 10 may transmit the authentication request signal to the charging authentication apparatus 30. However, various embodiments are not restricted to the above description. After receipt of the start signal, the communication controller 10 may receive an authentication request signal from the charger 200 (S52), and transfer the authentication request signal to the charging authentication apparatus 30 without modifying the authentication request signal or with properly modifying the authentication request signal.

Then, in response to the authentication request signal, the charging authentication apparatus may extract the third key information from a storage part, etc. (S54). Of course, the third key information may beforehand be learned or stored in the charging authentication apparatus 30, when the EV is released from a factory. Then, the charging authentication apparatus 30 may transmit the third key information to the charging controller 20 (S55). The third key information may be transferred to the charging controller 20 as included in the authentication request signal.

Then, the charging controller 20 may determine whether the authentication succeeds or not by comparing the third key information with the first key information learned or stored beforehand in the storage part 22 (S56). The first key information may beforehand be learned or stored in the charging controller 20 when the EV is released from a factory.

Based on a result of the determination, if the authentication is determined as failed, the charging controller 20 may block a charging process (S57). Then, according to implementation, the charging controller 20 may output a predetermined warning message (S58). The warning message may be output through a display apparatus or a speaker, which is equipped in the EV, and may be transmitted to a preconfigured user.

Also, if the authentication is determined as succeeded, the charging controller 20 may start the charging process (S59). Then, the charging controller 20 may perform or complete the charging process through the C&C communications with the charger 200 (S59a). Also, the charging controller 20 may perform a process of charging a fee via high-level communications with the charger 200 (S59b). The process of charging a fee may be performed based on the amount of power supplied from the charger 200 to the EV, by using the privacy information and/or financial information which are stored in the communication controller 10 and/or charging controller 20 and have been previously authenticated.

According to the present embodiment, even when the in-vehicle controller storing privacy information or financial information, such as the charging controller 20 or the charging authentication apparatus 30, are stolen or lost, abuse of the privacy information or financial information can be prevented by using key information learned or stored respectively by the charging controller 20 and the charging authentication apparatus 30.

Meanwhile, although the case to which the wireless power transfer is applied was explained as an example, various embodiments according to the present disclosure may also be applied to the conductive charging.

Figure 6:
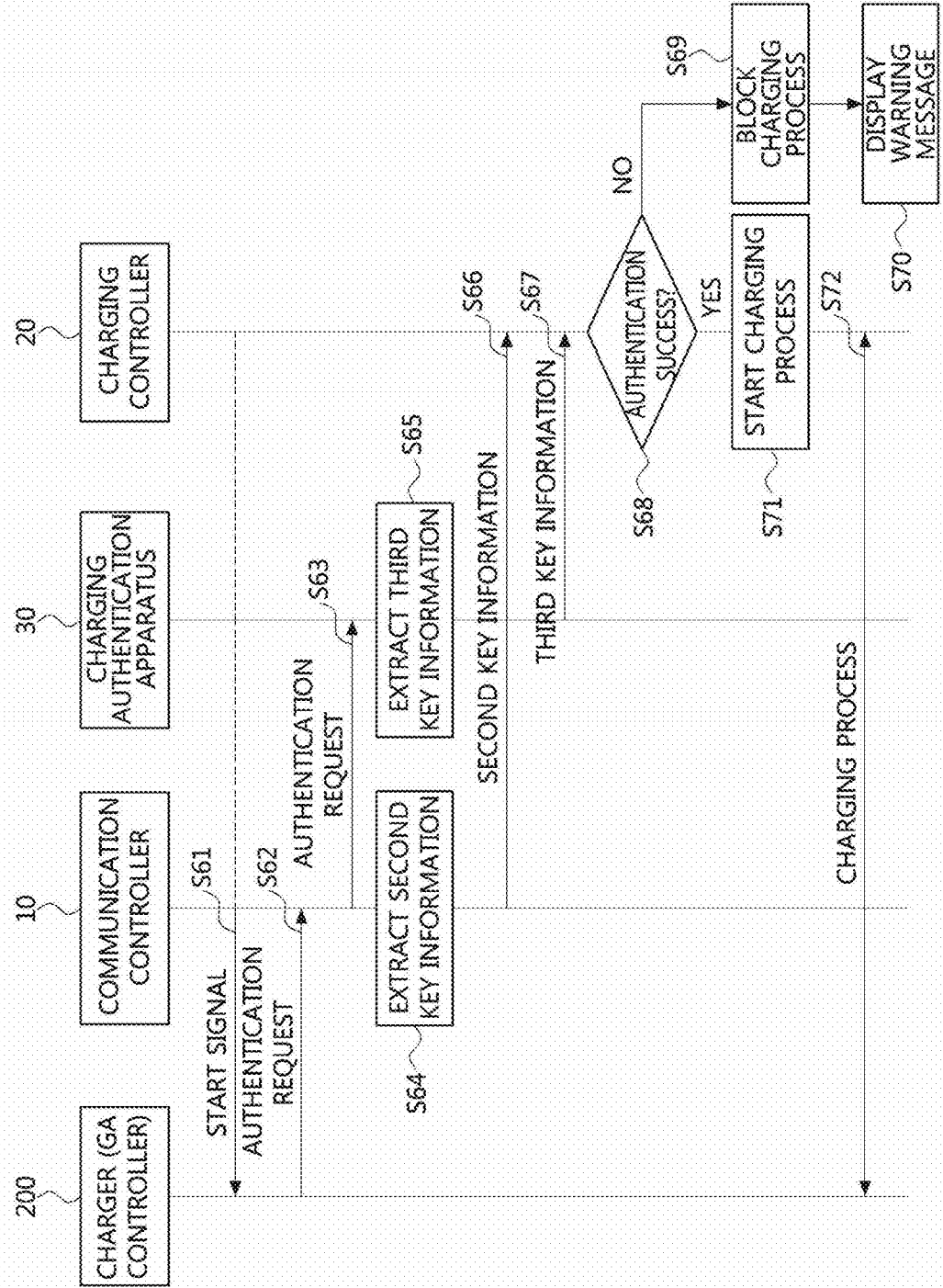
FIG. 6 is a sequence chart of a variation of a security method of an EV power transfer system according to another example embodiment of the present disclosure.

FIG. 6 is a sequence chart of a variation of a security method of an EV power transfer system according to another example embodiment of the present disclosure.

Referring to FIG. 6, a security method for an EV power transfer system according to the present embodiment may be started based on configuration of communications for conductive charging or wireless power transfer between the charger 200 and the EV wanting to charge its battery.

First, at least one of the communication controller 10, charging controller 20, and the charging authentication apparatus 30 may transmit a start signal for EV charging to the charger 200 (S61). In this step, the start signal may be transmitted by the communication controller 10, and the communication controller 10 may notify transfer of the start signal to the charging controller 20 or the charging authentication apparatus 30.

Then, the communication controller 10 may transmit an authentication request signal to the charging authentication apparatus 30 (S63). The communication controller 10 may transmit the authentication request signal to the charging authentication apparatus 30 after transmitting the start signal. However, various embodiments are not restricted to the above description. After transmitting the start signal, the communication controller 10 may receive an authentication request signal from the charger 200 (S62), and transfer the identical or modified authentication request signal to the charging authentication apparatus 30 in response to the authentication request signal.

Then, the communication controller 10 may extract the second key information from a storage part, etc. (S64). The second key information may beforehand be learned or stored when the EV is released from a factory. Similarly, the charging authentication apparatus 30 may extract the third key information from a storage part, etc. in response to the authentication request signal from the communication controller 10 (S65). The third key information may beforehand be learned or stored in the charging authentication apparatus 30 when the EV is released from a factory. However, various embodiments are not restricted thereto. In a case that the charging authentication apparatus 30 has a structure having a first part which includes privacy information and/or financial information and the third key information learned or stored beforehand in correspondence to the privacy information and/or financial information, and a second part fixed in the EV with which the removable first part can be combined, the third key information may be learned or stored by issuing or downloading to the first part through a separate path.

Then, the communication controller 20 may transmit the second key information to the charging controller 20 (S66). Then, the charging authentication apparatus 30 may transmit the third key information to the charging controller 20 (S67). The second key information and the third key information may be transferred to the charging controller 20 as included in the respective authentication request signals.

Then, the charging controller 20 may authenticate the third key information based on the second key information, or authenticate the charging process by comparing the second key information with the third key information (S68). Also, according to implementation, if the charging controller 20 learned or stored the first key information beforehand, in addition to the above-description, the charging controller 20 may selectively perform authentication on the charging process by comparing the first key information with at least one of the second key information and the third key information.

Then, after the determination in the step S68, if the authentication is determined as failed, the charging controller 20 may block a charging process (S69). Also, the charging controller 20 may output a predetermined warning message (S70). The warning message may be output by using a display apparatus, a speaker, etc. equipped in the EV, and transmitted to a preconfigured recipient.

Also, after the determination in the step S68, if the authentication is determined as succeeded, the charging controller 20 may start the charging process (S71). Then, the charging controller 20 may control the charging process through the C&C communications with the charger 200 (S72). Also, the charging controller 20 may perform a process of charging a fee with the charger 200 after completion of the charging process. The process of charging a fee may be performed based on the amount of power supplied from the charger 200 to the EV, by using the privacy information and/or financial information which are stored in at least one of the communication controller 10, charging controller 20, and charging authentication apparatus 30, and correspond to the key information having been previously authenticated.

According to the present embodiment, since the charging process is authenticated by comparing the key information respectively stored in the in-vehicle controllers storing privacy information and/or financial information, such as the communication controller 10 and the charging authentication apparatus 30, abuse of the privacy information and/or financial information can effectively prevented even when the communication controller 10 and/or charging authentication apparatus 30 are stolen or lost.

Figure 7:
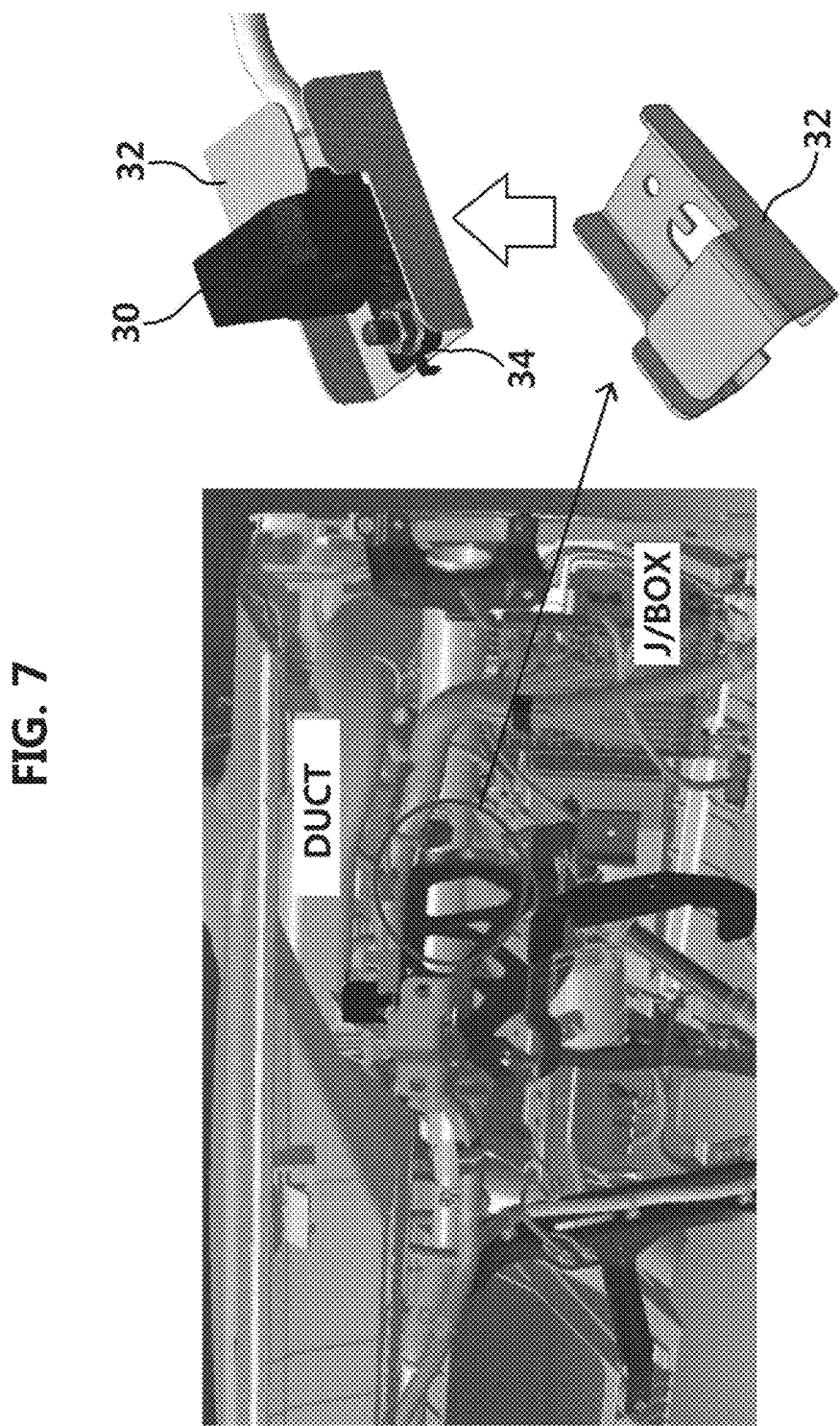
FIG. 7 is a view to explain a structure of a security apparatus which can be applied to an EV power transfer system.

FIG. 7 is a view to explain a structure of a security apparatus which can be applied to an EV power transfer system.

Referring to FIG. 7, a security apparatus for an EV power transfer system according to an example embodiment of the present disclosure may be implemented on at least one of the communication controller, charging controller, and charging authentication apparatus. Especially, in case that the charging authentication apparatus 30 is used, the charging authentication apparatus 30 may be hidden as located in an engine room of the EV.

Also, the charging authentication apparatus 30 may be attached to a body of the EV, and a housing or bracket 32 accommodating the charging authentication apparatus 30 may be fixed to the body of the EV, etc. by using a fastening means 34 such as bolts and nuts.

Of course, it may also be possible to combine the charging authentication apparatus 30 with the bracket 32, and fixing the bracket 32 to the body of the EV. However, even in this case, the charging authentication apparatus 30 and the bracket 32 which are fixed to the body of the EV may be installed as hidden in the EV, and not removable.

Figure 8:
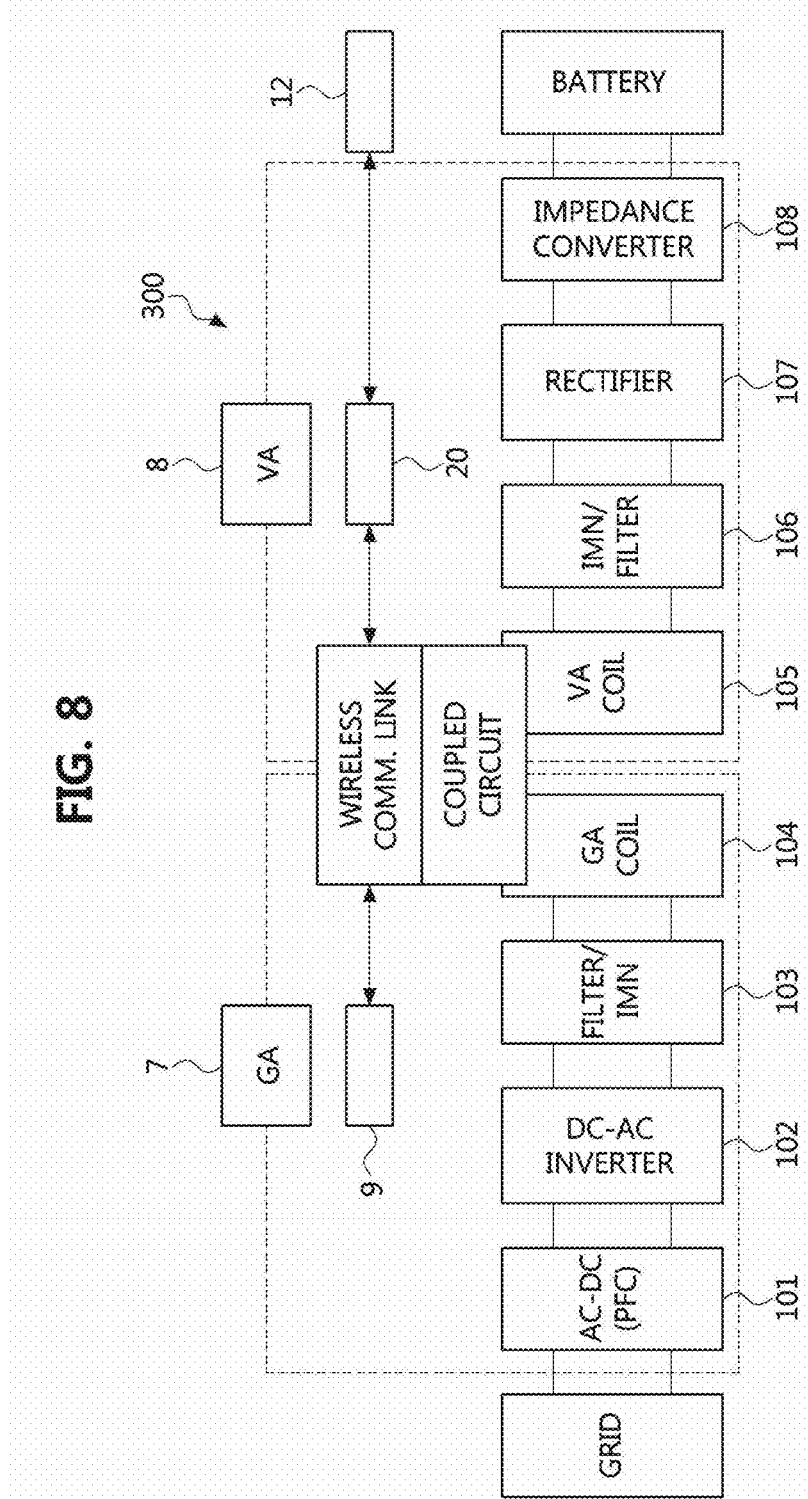
FIG. 8 is a block diagram to explain a structure of an EV wireless power transfer system to which embodiments according to the present disclosure can be applied, and a flow of wireless power transfer.

FIG. 8 is a block diagram to explain a structure of an EV wireless power transfer system to which embodiments according to the present disclosure can be applied, and a flow of wireless power transfer.

As illustrated in FIG. 8, an EV wireless power transfer system 300 for charging a battery of an EV, to which the security methods according to the present disclosure can be applied, may include a GA 7 corresponding to the charger, and a VA 8 equipped in the EV. After the above-described security method is performed and the authentication succeeds, start, continuation, and end of the wireless power transfer may be controlled through communications between a VA controller 20 corresponding to the charging controller equipped in the VA 8 and a GA controller 9 equipped in the GA 7.

Here, the VA controller 20 may be connected to other in-vehicle controllers 12 such as an engine electronic control unit via a CAN network. Also, after a secondary coil of the EV (i.e. VA coil 105) and a primary coil (i.e. GA coil 104) are magnetically aligned within a predetermined error range, the wireless power transfer may be started, and the battery of the EV may be charged through the wireless power transfer.

The configuration of the wireless power transfer system 300 and the flow of wireless power transfer are explained as follows. The GA 7 may include an AC-DC converter 101 having a power factor correction (PFC) function which is connected to a grid, a DC-AC converter 102, a filter/impedance matching network (IMN) 103, and a GA coil 104. The transponder 32 may be located near from the GA coil 204 of the HA 7. Also, the VA 8 may include a VA coil 105 forming a coupled circuit with the GA coil 104, an IMN/filter 106, a rectifier 107, and an impedance converter 108. The impedance converter 108 may be connected to the battery.

Also, the VA controller 20 may perform C&C communications and high-level communications with the GA controller 9 via wireless communication links in order to perform authentication on the charging process, wireless power transfer process, and process for charging a fee.

In addition, the flow of wireless power transfer may be explained as follows.

First, for the wireless power transfer procedure of the wireless charging system, a current to be charged to the battery is determined in the VA 8. Then, a power request is transferred from the VA 8 to the GA 8 via the wireless communication link.

Then, the GA 7 may recognize the power request from the VA 8, convert power supplied from a grid to high frequency AC current, and transfer it to the GA coil 104.

Then, the high frequency AC current having is transferred from the GA coil 104 to the VA coil 105 via coupling, rectified and processed in the VA 8, and finally charged to the battery.

The above-described procedure continues until the battery is fully charged and the VA transmits a signal indicating completion of charging to the GA.

According to embodiments of the present disclosure, a user or a charging controller of the user can be authenticated by an EV itself, in an EV wireless power transfer process or an EV charging process, so that theft or abuse of the charging controller in which privacy information and/or financial information are stored can be prevented.

While the example embodiments of the present disclosure and their advantages have been described in detail, it should be understood that various changes, substitutions and alterations may be made herein without departing from the scope of the disclosure.

What is claimed is:

1. A wireless power transfer controlling method for an electric vehicle (EV), the EV including a charging controller, a communication controller, and a charging authentication apparatus, the method comprising:
   receiving, by the charging controller, second key information from the communication controller;
   receiving, by the communication controller, an authentication request from outside of the EV;
   transferring, by the communication controller, the authentication request to the charging authentication apparatus;
   receiving, by the charging controller, third key information from the charging authentication apparatus;
   authenticating, by the charging controller, the third key information based on the second key information;
   performing, by the charging controller, a charging process in which a ground assembly wirelessly transfers power to the EV when the authentication succeeds;
   receiving, by the communication controller, a request for charging a fee based on an amount of power transferred from the ground assembly to the EV; and
   performing, by the charging controller, a process for charging the fee using privacy information or financial information corresponding to the second key information or the third key information.

2. The method according to claim 1, wherein the second key information or the third key information includes key information identical to an identifier or a random number stored in at least one of a controller of the EV, a smart key system control part of the EV, and an engine controller of the EV.

3. The method according to claim 1, further comprising, after the authenticating step, blocking the charging process when the authentication is determined as failed.

4. The method according to claim 1, further comprising, before the step of receiving the second key information and the step of receiving the third key information, receiving a start signal for charging the EV from an external charger or the communication controller, wherein the start signal include a beacon signal, a signal indicating start of network connection, or a wake on wireless local area network (WoWL) signal.

5. A wireless power transfer system including an electric vehicle (EV) and a ground assembly, the apparatus comprising:
   a communication controller disposed in the EV and configured to receive an authentication request from outside of the EV and transfer the authentication request to a charging authentication apparatus;
   a charging controller configured to receive second key information from the communication controller and third key information from the charging authentication apparatus disposed in the EV, and to compare the second key information with the third key information; and
   a charging blocking part of the charging controller configured to authenticate or block a charging process in which the ground assembly wirelessly transfers power to the EV based on a result of the comparison of the second key information with the third key information,
   wherein the communication controller is further configured to receive a request for charging a fee based on an amount of power transferred from the ground assembly to the EV,
   wherein the charging controller is configured to perform the charging process in which the ground assembly wirelessly transfers power to the EV when the charging process is authenticated, and to perform a process for charging the fee based on the amount of power transferred from the ground assembly to the EV using privacy information or financial information corresponding to the second key information or the third key information.

6. The apparatus according to claim 5, wherein the charging blocking part is included in the charging controller equipped in the EV.

7. The apparatus according to claim 5, further comprising an interface connecting with the communication controller, wherein the interface uses a controller area network (CAN) communication in the EV.

8. The apparatus according to claim 7, wherein the apparatus further includes a storage part storing first key information, wherein:
   the communication controller is configured to provide the second key information via the interface, or
   the charging authentication apparatus is configured to provide the third key information via the interface.

9. The apparatus according to claim 8, wherein the charging authentication apparatus is installed in the EV as hidden and fixed by using a bracket.

* * * * *